US010880732B2

(12) United States Patent
Bombacino et al.

(10) Patent No.: US 10,880,732 B2
(45) Date of Patent: *Dec. 29, 2020

(54) AUTHENTICATION OF PHONE CALLER IDENTITY

(71) Applicant: International Business Machines Corporation, Armonk, NY (US)

(72) Inventors: Vinicio Bombacino, Rome (IT); Antonio Di Cocco, Rome (IT); Leonardo Lanni, Rome (IT); Andrea Tortosa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,655

(22) Filed: Oct. 31, 2019

(65) Prior Publication Data

US 2020/0068394 A1 Feb. 27, 2020

Related U.S. Application Data

(63) Continuation of application No. 14/986,660, filed on Jan. 2, 2016, now Pat. No. 10,499,243, which is a (Continued)

(51) Int. Cl.
*H04W 12/02* (2009.01)
*H04W 12/00* (2009.01)
(Continued)

(52) U.S. Cl.
CPC ..... *H04W 12/0013* (2019.01); *H04L 63/0428* (2013.01); *H04M 3/42059* (2013.01);
(Continued)

(58) Field of Classification Search
CPC ......... H04W 12/0013; H04W 12/0401; H04W 12/0609; H04W 12/02; H04W 12/04;
(Continued)

(56) References Cited

U.S. PATENT DOCUMENTS 5,289,542 A 2/1994 Kessler
5,392,357 A 2/1995 Bulfer et al.
(Continued)

OTHER PUBLICATIONS

Ring, Jared et al.; A New Authentication Mechanism and Key Agreement Protocol for SIP Using Identity-based cryptography; Proceedings AusCERT Asia Pacific Information Technology Security Conference 2006; 2006.
(Continued)

*Primary Examiner* — Jean A Gelin
(74) *Attorney, Agent, or Firm* — James L. Baudino

(57) ABSTRACT

According to one aspect of the present disclosure, a method and technique for caller authentication is disclosed. The method includes, responsive to receiving a call from a telephone unit, identifying a received encrypted identification object having information associated with an identity of a caller placing the call. A telephone number corresponding to the caller is identified and a decryption key associated with the call is generated by combining the telephone number with a decryption code. The identification object is decrypted using the generated decryption key and an identity of the caller placing the call from the second telephone unit is verified based on the decrypted identification object.

20 Claims, 6 Drawing Sheets

Related U.S. Application Data continuation of application No. 13/732,838, filed on Jan. 2, 2013, now Pat. No. 9,232,394.

(51) Int. Cl.
  *H04W 12/08* (2009.01)
  *H04W 12/04* (2009.01)
  *H04W 12/06* (2009.01)
  *H04L 29/06* (2006.01)
  *H04M 3/42* (2006.01)

(52) U.S. Cl.
  CPC ....... *H04W 12/02* (2013.01); *H04W 12/0401* (2019.01); *H04W 12/0403* (2019.01); *H04W 12/0609* (2019.01); *H04W 12/08* (2013.01)

(58) Field of Classification Search
  CPC . H04W 12/06; H04W 12/08; H04M 3/42059; H04L 63/0428
  USPC ........................................ 455/410, 411, 414.1
  See application file for complete search history.

(56) References Cited

U.S. PATENT DOCUMENTS

| | | | |
|---|---|---|---|
| 5,434,920 A | 7/1995 | Cox et al. | |
| 5,768,383 A | 6/1998 | Sansone et al. | |
| 5,974,142 A | 10/1999 | Heer et al. | |
| 6,111,953 A | 8/2000 | Walker et al. | |
| 6,234,271 B1 | 5/2001 | Suzuki et al. | |
| 6,275,573 B1 | 8/2001 | Naor et al. | |
| 6,324,271 B1 | 11/2001 | Sawyer et al. | |
| 7,228,155 B2 | 6/2007 | Saunders | |
| 7,610,056 B2* | 10/2009 | Zapata | H04W 12/0013 455/466 |
| 7,734,028 B2 | 6/2010 | Dhara et al. | |
| 7,743,247 B1 | 6/2010 | Horgan et al. | |
| 8,037,307 B2 | 10/2011 | Irwin, Jr. | |
| 8,103,261 B2 | 1/2012 | Parker et al. | |
| 8,391,837 B2* | 3/2013 | Corda | G06Q 20/35765 455/410 |
| 9,413,882 B2* | 8/2016 | Gisby | H04K 1/00 |
| 2005/0277405 A1* | 12/2005 | Noguchi | H04N 1/00334 455/411 |
| 2006/0120345 A1* | 6/2006 | Sung | H04L 65/1069 370/351 |
| 2006/0271483 A1* | 11/2006 | Ernst | H04N 21/2543 705/51 |
| 2007/0249375 A1 | 10/2007 | Zapata et al. | |
| 2008/0037720 A1* | 2/2008 | Thomson | H04M 3/4931 379/88.01 |
| 2008/0080485 A1 | 4/2008 | Rosen | |
| 2008/0144787 A1 | 6/2008 | Gantman et al. | |
| 2008/0144827 A1* | 6/2008 | Davis | H04K 1/00 380/270 |
| 2008/0181379 A1 | 7/2008 | Chow et al. | |
| 2009/0016538 A1 | 1/2009 | Drudis et al. | |
| 2009/0182999 A1 | 7/2009 | Krig | |
| 2009/0270073 A1 | 10/2009 | Ling et al. | |
| 2010/0250925 A1* | 9/2010 | Hiraide | G06F 21/6209 713/165 |
| 2011/0026699 A1 | 2/2011 | Amir et al. | |
| 2011/0085650 A1 | 4/2011 | Cheon et al. | |
| 2011/0116612 A1 | 5/2011 | Ho | |
| 2011/0135093 A1 | 6/2011 | Radatti | |
| 2012/0204032 A1 | 8/2012 | Wilkins et al. | |
| 2012/0272060 A1 | 10/2012 | Lin et al. | |
| 2012/0304255 A1 | 11/2012 | Carnes | |
| 2014/0086397 A1 | 3/2014 | Febonio et al. | |
| 2016/0308840 A1* | 10/2016 | Munshi | H04L 63/083 |
| 2017/0323300 A1 | 11/2017 | Weiss | |

OTHER PUBLICATIONS

Caller/Called Authentication in a Phone Call; Internet source (http://ip.com/IPCOM/000135058); Overview page; Mar. 28, 2006.

* cited by examiner

AUTHENTICATION OF PHONE CALLER IDENTITY

BACKGROUND

Mobile or wireless telephone units are used in both personal and business applications. Telephone systems generally have the capability to provide caller identification services (caller ID) for identifying a calling party, such as displaying a telephone number and/or name associated with the calling party account. The caller ID information may enable the called party to at least identify the telephone number and/or name that may be associated with a received call.

BRIEF SUMMARY

According to one aspect of the present disclosure a method and technique for authentication of caller identity is disclosed. The method includes, responsive to receiving a call from a telephone unit, identifying a received encrypted identification object having information associated with an identity of a caller placing the call. A telephone number corresponding to the caller is identified and a decryption key associated with the call is generated by combining the telephone number with a decryption code. The identification object is decrypted using the generated decryption key and an identity of the caller placing the call from the second telephone unit is verified based on the decrypted identification object.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
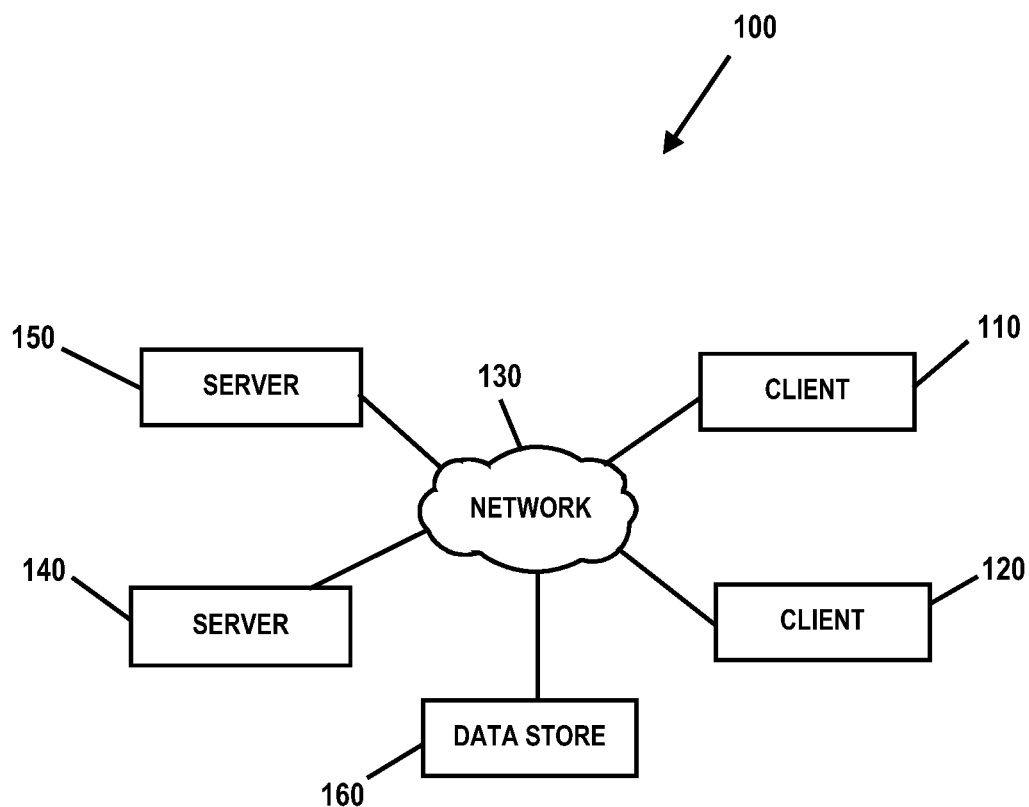
FIG. 1 is an embodiment of a network of data processing systems in which the illustrative embodiments of the present disclosure may be implemented.

Embodiments of the present disclosure provide a method, system and computer program product for authentication of phone caller identity. For example, in some embodiments, the method and technique includes: responsive to initiation of a telephone call by a caller from a first telephone unit to a second telephone unit, retrieving an identification object comprising identification information corresponding to the caller; encrypting the identification object using an encryption key stored on the first telephone unit; and transmitting, as part of the telephone call, the encrypted caller identification object to a telephone network destined for the second telephone unit. Thus, in some embodiments of the present disclosure, a calling party encrypts an identification object having information corresponding to an identity of the calling party and transmits the encrypted identification information to the called party as part of the telephone call (e.g., inserted into the body of the session initiation protocol (SIP) invitation). The receiving or called party may decrypt the received identification object using a decryption key previously received from the calling party or received from a third party certificate authority (e.g., a telephone service provider). The decrypted result may then be evaluated to determine the authenticity of the identity of the calling party. For example, if the decrypted result is scrambled or illegible, the authentication logic on the called telephone unit may return an error or other notice of failure of caller identity authentication. The receiving or called party may then reject the call, if desired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
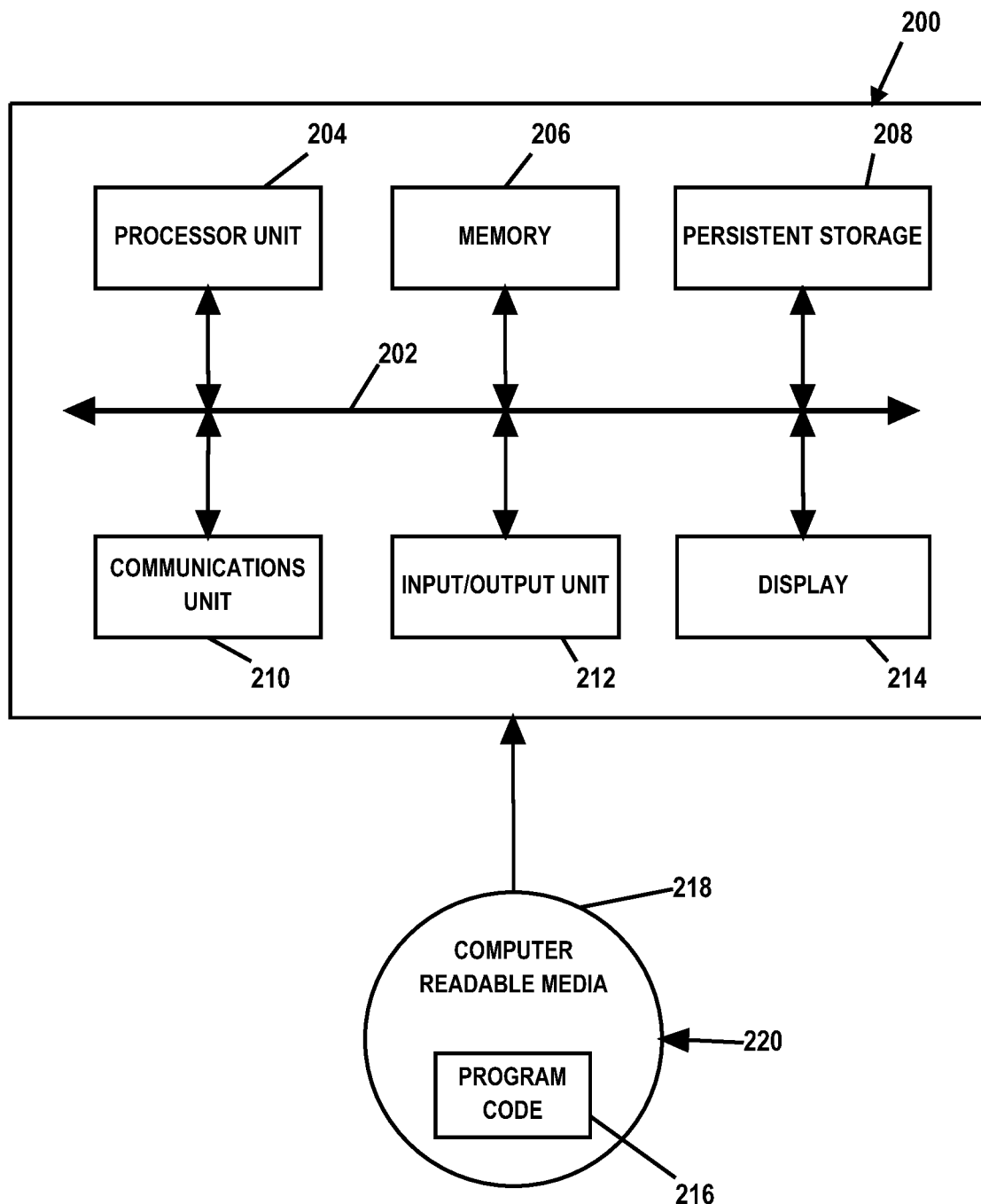
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers and/or computing or data processing devices in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone switching infrastructure, etc. FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for authenticating an identity of a telephone caller according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
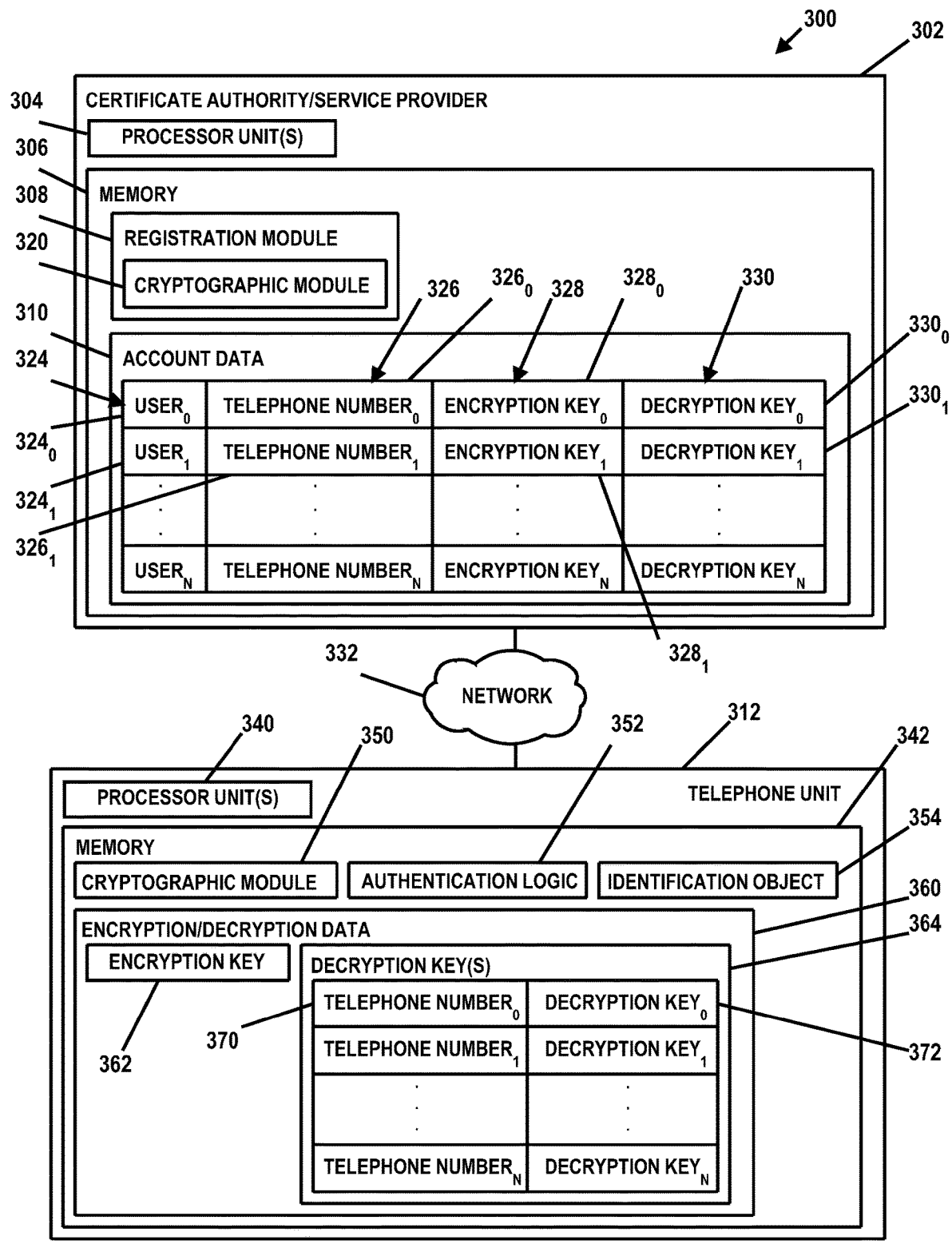
FIG. 3 is a diagram illustrating an embodiment of a data processing system for authentication of phone caller identity in which illustrative embodiments of the present disclosure may be implemented.

FIG. 3 is an illustrative embodiment of a system 300 for authenticating an identity of a calling party or telephone caller. As mentioned above, although some telephone systems enable caller identification (caller ID) information to be transmitted to a called party, there may be situations where caller ID information is unavailable or blocked. Additionally, a calling party may have the ability to create and transmit false or misleading information to a called party (e.g., as part of the caller ID information or as a separate transmitted element of the call). System 300 enables authentication of caller identity. System 300 may be implemented on data processing systems or platforms such as, but not limited to, servers 140 and/or 150, clients 110 and/or 120, or at other data processing system locations (e.g., on telephone or mobile/wireless units). For example, in the embodiment illustrated in FIG. 3, system 300 comprises a certificate of authority 302 and having one or more processor units 304 and a memory 306. In the embodiment illustrated in FIG. 3, memory 306 comprises a registration module 308 and account data 310. Registration module 308 is used to register a telephone unit 312 and/or a user/owner of telephone unit 312 to enable an identity of a caller or user of telephone unit 312 to be authenticated by a called or receiving telephone unit. In some embodiments, certificate authority 302 may comprise a telephone service provider; however, it should be understood that in some embodiments, certificate authority 302 may comprise an entity other than a telephone service provider. Registration module 308 may be implemented in any suitable manner using known techniques that may be hardware-based, software-based, or some combination of both. For example, registration module 308 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 3, registration module 308 includes a cryptographic module 320 for performing various functions and/or operations corresponding to registering telephone unit 312 for caller authentication. For example, in some embodiments, cryptographic module 320 is used to generate a set of encryption/decryption keys corresponding to the registered telephone unit to enable a caller identification object associated with the registered telephone unit to be encrypted with a respective encryption key and decrypted by a called telephone unit with the respective decryption key. In the embodiment illustrated in FIG. 3, account data 310 comprises information associated with each registered telephone unit for which encryption and decryption keys have been generated. For example, in some embodiments, each user or owner 324 of a particular telephone unit may be assigned or have associated therewith a particular telephone number 326. For the particular user 324 and/or telephone number 326, cryptographic module 320 is used to generate an asymmetric key pair comprising an encryption key 328 and a decryption key 330. As will be described in further detail below, in connection with an outgoing telephone call by a telephone unit, encryption key 328 is used to encrypt an identification object corresponding to the caller/user of the telephone unit, and decryption key 330 is used to decrypt an encrypted identification object received as part of a telephone call from another telephone unit. The registration of telephone unit 312 with certificate authority 302 and/or the communication of encryption/decryption keys 328/330 may be performed over a communication network 332 such as, but not limited to, the Internet, a telephone switching network, or other type of communication network.

In the embodiment illustrated in FIG. 3, telephone unit 312 includes one or more processor units 340 and a memory 342. In the illustrated embodiment, memory 342 includes a cryptographic module 350, authentication logic 352, and an identification object 354. Identification object 354 may comprise any type of object having personally identifiable information corresponding to a user/owner of telephone unit 312. For example, identification object 354 may comprise a text object (e.g., a vCard or other type of text file) including a name or other identifying information corresponding to the user (calling party) of telephone unit 312, a digital image of the user, or other type of information uniquely identifying the user to enable another telephone unit (called party) to authenticate the identity of the calling party. Cryptographic module 350 is used to encrypt identification object 354 to enable the encrypted identification object 354 to be transmitted over a telephone switch network to a receiving telephone unit. Authentication logic 352 may be used to interface with certificate authority 302 to enable registration of telephone unit 312 with certificate of authority 302 and/or obtain/receive encryption/decryption keys from the certificate of authority 302. Authentication logic 352 may also be used to analyze and/or otherwise verify an identification object (e.g., after decryption) received from another telephone unit. Cryptographic module 350 and/or authentication logic 352 may be implemented in any suitable manner using known techniques that may be hardware-based, software-based, or some combination of both. For example, cryptographic module 350 and/or authentication logic 352 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the illustrated embodiment, memory 342 also includes encryption/decryption data 360 comprising an encryption key 362 and, if obtained by telephone unit 312, one or more decryption keys 364 corresponding to other telephone units. Encryption key 362 comprises the encryption key generated by certificate of authority 302 and assigned to telephone unit 312 (e.g., encryption key 328 corresponding to a particular telephone unit). In the illustrated embodiment, each telephone number 370 corresponding to another telephone unit is associated with and/or otherwise related to a particular decryption key 372 for decrypting an encrypted identification object received from a telephone unit corresponding to the particular telephone number 370. The decryption key 372 may be obtained by telephone unit 312 from the certificate of authority 302 or directly from another telephone unit.

In operation, a user/owner or other entity may register telephone unit 312 with certificate of authority 302 (e.g., upon initiation of telephone service with a service provider or at another time) to enable the generation of encryption key 328 to be used by telephone unit 312 to encrypt identification object 354 and the generation of decryption key 330 to be used by other telephone units to decrypt an encrypted identification object received from telephone unit 312. The encryption key 328 associated with the particular telephone number 326 assigned to telephone unit 312 (e.g., a telephone number stored on a subscriber identity module (SIM) card of telephone unit 312) may be obtained from certificate of authority 302 and entered/stored manually in telephone unit 312 (e.g., as encryption key 362) or obtained/received electronically via network 332 from certificate of authority 302. In some embodiments, only encryption key 328/362 is received by telephone unit 312 from certificate of authority 302 while decryption key 330 associated with telephone unit 312 may be obtained by other telephone units directly from certificate of authority 302. In other embodiments, decryption key 330 associated with telephone unit 312 may also be obtained by telephone unit 312 from certificate of authority 302 and stored on telephone unit 312 to facilitate the transmittal of decryption key 330 to other telephone units to thereafter enable such other telephone units to decrypt an encrypted identification object 354 received from telephone unit 312. For example, in some embodiments, a user/owner of telephone unit 312 may provide a user/owner of another telephone unit with its decryption key 330 by oral communication to enable another user/owner of a telephone unit to enter/store decryption key 330 in their telephone unit (e.g., by entering a code into the receiving party's telephone unit using a keypad or other input device). In some embodiments, telephone unit 312 may be configured to automatically transmit the decryption key 330 associated with telephone unit 312 to another telephone unit (e.g., in response to a user/owner of telephone unit 312 inputting a transmit request or other code such that telephone unit 312 automatically transmits decryption key 330 over a telephone switch network to the receiving telephone unit, such as in the form of dual-tone multi-frequency (DTMF) signals). The receiving telephone unit may be configured to prepare to accept a particular series of DTMF signals as the decryption key 330 corresponding to the communicating telephone unit 312 and store decryption key 330 as corresponding to the decryption key for telephone unit 312.

In response to initiation of a telephone call by telephone unit 312, authentication logic 352 may cause cryptographic module 350 to encrypt identification object 354 using encryption key 362 and transmit the encrypted identification object 354 to a receiving telephone unit as part of the initiated telephone call (e.g., inserted into the body of the session initiation protocol (SIP) invitation). At the receiving telephone unit, authentication logic 352 may identify the telephone number 370 of the initiating telephone unit 312 (e.g., via caller ID information) and determine/identify the decryption key 372 associated with the calling telephone unit 312 to enable decryption of the received encrypted identification object 354. The receiving telephone unit decrypts the encrypted identification object 354 and authentication logic 352 on the receiving telephone unit may be used to verify and/or authenticate the identity of the user/owner of the calling telephone unit 312 (e.g., by evaluating the legibility of the decrypted identification object 354 or by otherwise displaying to a user/owner of the receiving telephone unit the result of the decrypted identification object 354 to thereby enable the user/owner of the receiving telephone unit to evaluate the decrypted result).

Figure 4:
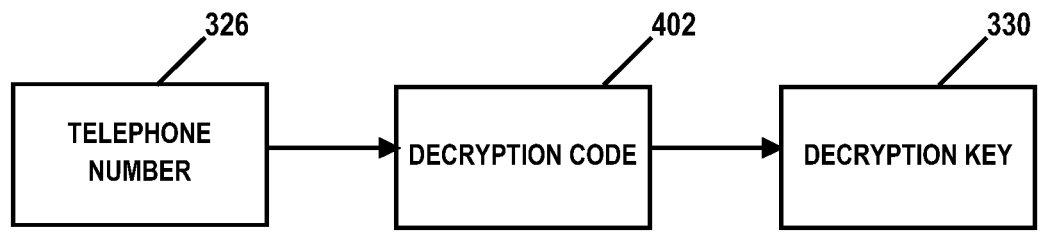
FIG. 4 is a diagram illustrating a decryption key derivation for authentication of caller identity in accordance with an embodiment of the present disclosure.

FIG. 4 is a diagram illustrating derivation of a decryption key 330 in response to receipt of a telephone call from another telephone unit including an encrypted identification object. In some embodiments, certificate of authority 302 may generate a decryption code 402 that is used in combination with a particular telephone number 326 to form decryption key 330 corresponding to a calling telephone unit. For example, in some embodiments, decryption code 402 may comprise an alphanumeric string that is combined with a numeric string corresponding to a particular telephone number 326 of the calling telephone unit to form decryption key 330 that is then used to decrypt a received encrypted identification object from the calling telephone unit. In some embodiments, the telephone number 326 of the calling telephone unit may be derived from caller identification information that enables identification of the telephone number of the telephone unit initiating the telephone call. The receiving telephone unit may then access a relational database (e.g., decryption keys 364) to identify a particular decryption code 402 associated with the caller telephone number 326.

Figure 5:
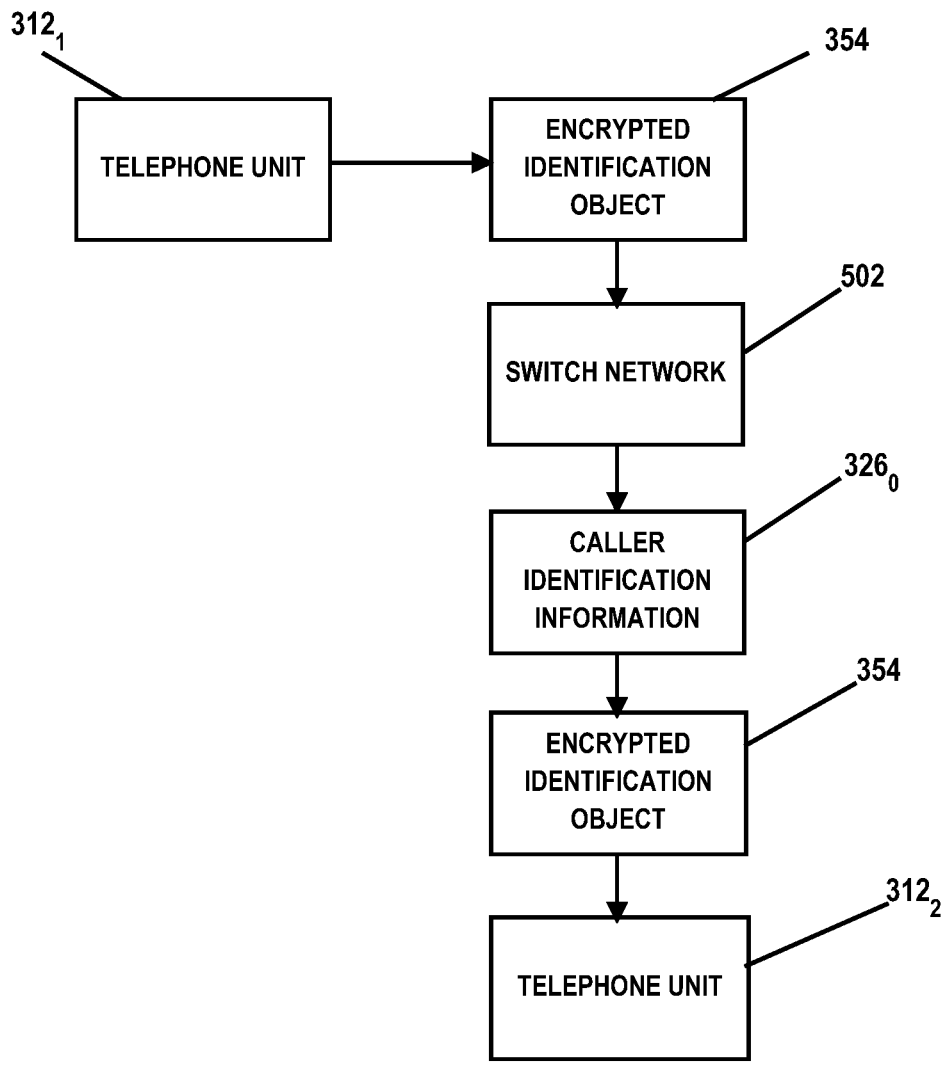
FIG. 5 is a diagram illustrating a data communication between a calling telephone unit and a called telephone unit for authentication of caller identity in accordance with an embodiment of the present disclosure.

FIG. 5 is a diagram illustrating authentication of phone caller identity in accordance with an embodiment of the present disclosure. In the illustrated embodiment, telephone unit $312_1$ is initiating a telephone call to a telephone unit $312_2$. For illustrative purposes, telephone unit $312_1$ may correspond to a user $324_0$ and have assigned thereto telephone number $326_0$ (FIG. 3). Telephone unit $312_1$ registered with certificate of authority 302 and was assigned encryption key $328_0$ and decryption key $330_0$. At least encryption key $328_0$ is stored on telephone unit $312_1$ (in some embodiments, decryption key $330_0$ may also be stored on telephone unit $312_1$). Telephone unit $312_2$ may also have registered with certificate of authority 302 and had assigned thereto for a user $324_1$ a telephone number $326_1$ along with an encryption key $328_1$ and a decryption key $331_1$. At least encryption key $328_1$ is stored on telephone unit $312_2$ (in some embodiments, decryption key $330_1$ may also be stored on telephone unit $312_2$).

During a previous telephone communication exchange between telephone units $312_1$ and $312_2$, telephone unit $312_1$ may have transmitted to telephone unit $312_2$ its decryption key $330_0$. In some embodiments, telephone unit $312_2$ may have received decryption key $330_0$ directly from certificate authority 302. Telephone unit $312_2$ stores therein decryption key $330_0$ as corresponding to the telephone number $326_0$.

In operation, telephone unit $312_1$ initiates a telephone call to telephone unit $312_2$, and as part of the initiated telephone call, retrieves its identification object 354 and encrypts identification object 354 with encryption key $328_0$. Telephone unit $312_1$ transmits the encrypted identification object 354 to a telephone switch network 500 destined to telephone unit $312_2$. Telephone unit $312_2$ receives the encrypted identification object 354 along with caller identification information (e.g., telephone number $326_0$ corresponding to telephone unit $312_1$). Authentication logic 352 on telephone unit $312_2$ determines and/or identifies the decryption key corresponding to the telephone number $326_0$ (e.g., decryption key $330_0$) and decrypts the received encrypted identification object 354 using cryptographic module 350. As indicated above, in some embodiments, decryption key $330_0$ may be formed based on a combination of telephone number $326_0$ and a particular decryption code 402 assigned to telephone number $326_0$. Authentication logic 352 on telephone unit $312_2$ evaluates and/or otherwise displays the result of the decryption to authenticate the calling party of telephone unit $312_1$.

As discussed above, telephone unit $312_2$ may have stored thereon a plurality of correlated telephone numbers and decryption keys corresponding to a plurality of other telephone units such that an encrypted identification object received from any such other telephone unit may be decrypted using a corresponding decryption key. The decryption keys corresponding to such other telephone units may have been obtained directly from certificate authority 302 or directly from the other telephone units. For example, as described above, during a previous communication exchange between telephone unit $312_1$ and telephone unit $312_2$, a user/owner of telephone unit $312_1$ may have initiated a transmittal of its decryption key $330_0$ to telephone unit $312_2$ by inputting a particular code or request input (e.g., inputting a passcode, pin or other input into a keypad of telephone unit $312_1$). A user/owner of telephone unit $312_2$ may have initiated a process on telephone unit $312_2$ to receive, accept, assign and store on telephone unit $312_2$ the received decryption key $330_0$ as corresponding to telephone number $326_0$, thereby enabling subsequently received encrypted identification objects 354 from telephone unit $312_1$ to be decrypted and the identity of the caller authenticated.

Figure 6:
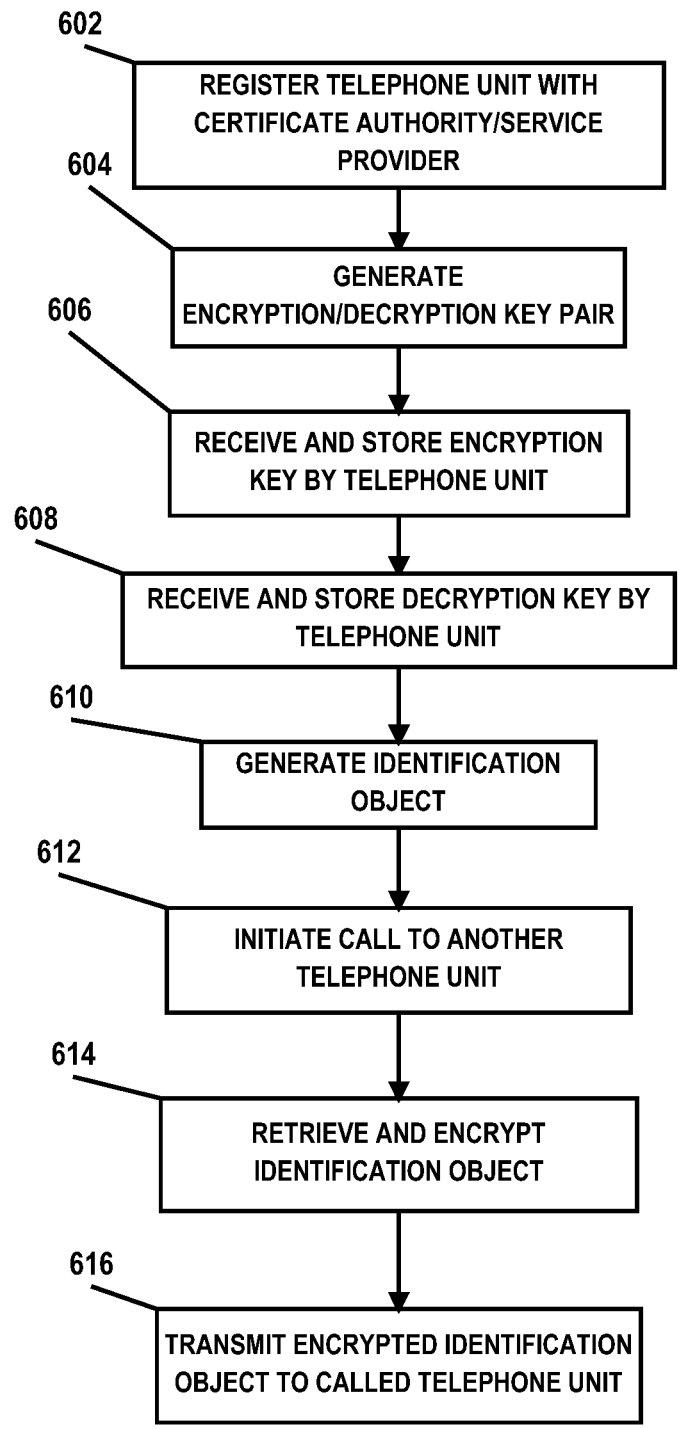
FIG. 6 is a flow diagram illustrating an embodiment of a method for authentication of caller identity in accordance with an embodiment of the present disclosure.

FIG. 6 a flow diagram illustrating an embodiment of a method for authentication of phone caller identity. The method begins at block 602, where telephone unit 312 is registered with certificate authority 302. At block 604, certificate authority 302 generates encryption key 328 and decryption key 330 for the registered telephone unit 312. At block 606, telephone unit 312 receives and stores therein an encryption key 328. At block 608, telephone unit 312 receives and stores therein decryption key 330. At block 610, identification object 354 is generated containing personally identifiable information corresponding to a caller/owner of telephone unit 312. At block 612, telephone unit 312 initiates a call to another telephone unit. At block 614, authentication logic 352 retrieves identification object 354 and encrypts identification object 354 with encryption key 328. At block 616, telephone unit 312 transmits the encrypted identification object 354 to the telephone switch network 502 destined for the called telephone unit.

Figure 7:
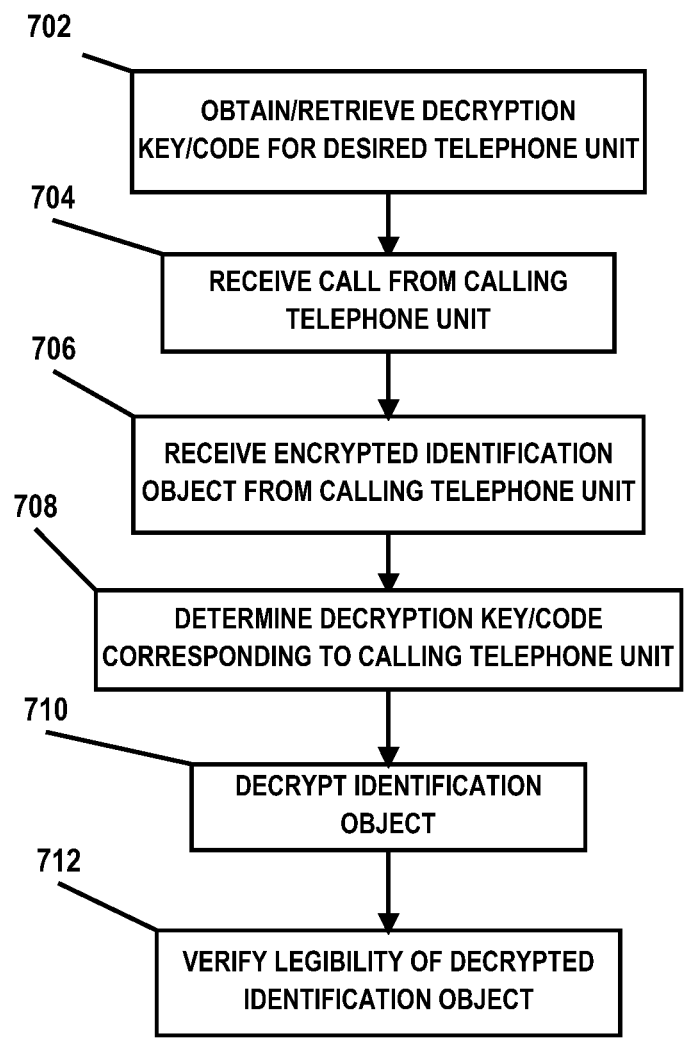
FIG. 7 is a flow diagram illustrating another embodiment of a method for authentication of caller identity in accordance with the present disclosure.

FIG. 7 is a flow diagram illustrating another embodiment of a method for authentication of phone caller identity. The method begins at block 702, where a telephone unit (e.g., telephone $312_2$) obtains and/or retrieves a decryption key 330 and/or decryption code 402 for a desired or particular telephone unit (e.g., for telephone unit $312_1$). At block 704, a call is received from another telephone unit (e.g., a call is received by telephone unit $312_2$ from telephone unit $312_1$). At block 706, the telephone unit receives an encrypted identification object 354 from the calling telephone unit (e.g., telephone unit $312_2$ receives an encrypted identification object 354 from telephone unit $312_1$). At block 708, the telephone unit determines and/or otherwise identifies the decryption key/code corresponding to the calling telephone unit (e.g., determines and/or otherwise identifies the decryption key/code $330_0$/402 corresponding to telephone unit $312_1$ based on telephone number $326_0$). At block 710, authentication logic 352 and/or cryptographic module 350 on the receiving telephone unit is used to decrypt the received encrypted identification object 354. At block 712, authentication logic 352 authenticates the identity of the calling party (e.g., by evaluating and/or verifying the legibility of the decrypted identification object 354 (e.g., by parsing various portions of the decrypted result that should correspond to a common or expected data format), by displaying the result of the decryption to the user/owner of the receiving telephone unit or otherwise evaluating the result of the decryption).

Thus, embodiments of the present disclosure enable authentication of a caller's identity in a mobile or wireless phone call. For example, embodiments of the present disclosure enable a calling party to encrypt an identification object having information corresponding to an identity of the calling party and transmit the encrypted identification information to the called party as part of the telephone call (e.g., inserted into the body of the session initiation protocol (SIP) invitation). The receiving or called party may decrypt the received identification object using a decryption key previously received from the calling party or received from a third party certificate authority (e.g., a telephone service provider). The decrypted result may then be evaluated to determine the authenticity of the identity of the calling party. For example, if the decrypted result is scrambled or illegible, the authentication logic 352 may return an error or other notice of failure of caller identity authentication. The receiving or called party may then reject the call, if desired.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
    responsive to receiving, by a first telephone unit, a call from a second telephone unit, identifying an encrypted identification object received from the second telephone unit, the identification object having information associated with an identity of a caller placing the call from the second telephone unit;
    identifying, by the first telephone unit, a telephone number corresponding to the second telephone unit;
    generating, by the first telephone unit, a decryption key associated with the call from the second telephone unit by combining the telephone number with a decryption code;
    decrypting, by the first telephone unit, the identification object received from the second telephone unit using the generated decryption key; and
    verifying, by the first telephone unit, an identity of the caller placing the call from the second telephone unit based on the decrypted identification object.

2. The method of claim 1, further comprising assigning the decryption code to the second telephone unit.

3. The method of claim 1, further comprising receiving, by the first telephone unit, the decryption code from a certificate authority based on the telephone number.

4. The method of claim 1, wherein verifying the identity of the caller includes evaluating the legibility of the decrypted identification object.

5. The method of claim 1, further comprising receiving, by the first telephone unit, the decryption code from the second telephone unit via a previous communication with the second telephone unit.

6. The method of claim 5, further comprising receiving the decryption code from the second telephone unit as DTMF signals.

7. A system, comprising:
    a first telephone unit having a processor and logic executable by the processor to:
        register the first telephone unit with a service provider to generate a decryption code, the decryption code combinable with a telephone number assigned to the first telephone unit to form a decryption key;
        responsive to initiation of a telephone call by a caller from the first telephone unit to a second telephone unit, retrieve an identification object comprising identification information corresponding to the caller;
        encrypt the identification object using an encryption key stored on the first telephone unit, the encryption key associated with the telephone number assigned to the first telephone unit; and
        transmit, as part of the telephone call, the encrypted caller identification object to a telephone network destined for the second telephone unit, the encrypted caller identification object decryptable by the second telephone unit via the decryption key.

8. The system of claim 7, wherein the logic is executable to, responsive to registering the first telephone unit with the service provider, receive and store, on the first telephone unit, the encryption key from the service provider.

9. The system of claim 7, wherein the logic is executable to retrieve from the service provider a decryption code associated with the second telephone unit.

10. The system of claim 7, wherein the logic is executable to:
    store the decryption key on the first telephone unit; and
    responsive to receiving an input requesting a transmission of the decryption key, automatically transmit the decryption key to the telephone network destined for the second telephone unit.

11. The system of claim 7, wherein the logic is executable to transmit the decryption key to the second telephone unit.

12. The system of claim 7, wherein the logic is executable to communicate the telephone number to the second telephone unit.

13. The system of claim 7, wherein the logic is executable to transmit the decryption key to the second telephone unit as DTMF signals.

14. A computer program product for authentication of phone caller identity, the computer program product comprising:
a non-transitory computer readable medium having computer readable program code embodied therewith, the computer readable program code configured to:
register a first telephone unit with a service provider to generate a decryption code, the decryption code combinable with a telephone number assigned to the first telephone unit to form a decryption key;
responsive to initiation of a telephone call by a caller from the first telephone unit to a second telephone unit, retrieve an identification object comprising identification information corresponding to the caller;
encrypt the identification object using an encryption key stored on the first telephone unit, the encryption key associated with the telephone number assigned to the first telephone unit; and
transmit, as part of the telephone call, the encrypted caller identification object to a telephone network destined for the second telephone unit, the encrypted caller identification object decryptable by the second telephone unit via the decryption key.

15. The computer program product of claim 14, wherein the computer readable program code is configured to, responsive to registering the first telephone unit with the service provider, receive and store, on the first telephone unit, the encryption key from the service provider.

16. The computer program product of claim 14, wherein the computer readable program code is configured to retrieve from the service provider a decryption code associated with the second telephone unit.

17. The computer program product of claim 14, wherein the computer readable program code is configured to:
store the decryption key on the first telephone unit; and
responsive to receiving an input requesting a transmission of the decryption key, automatically transmit the decryption key to the telephone network destined for the second telephone unit.

18. The computer program product of claim 14, wherein the computer readable program code is configured to transmit the decryption key to the second telephone unit.

19. The computer program product of claim 14, wherein the computer readable program code is configured to communicate the telephone number to the second telephone unit.

20. The computer program product of claim 14, wherein the computer readable program code is configured to transmit the decryption key to the second telephone unit as DTMF signals.

* * * * *